UNITED STATES PATENT OFFICE 1,990,511

REDUCTION OF NITROGUANIDINE

Joseph A. Wyler, Allentown, Pa., assignor to Trojan Powder Company, a corporation of New York No Drawing. Application September 13, 1933, Serial No. 689,268

5 Claims. (Cl. 260—125)

My invention relates to improvements in the reduction of nitroguanidine, and more particularly relates to improved means for preparing aminoguanidine or the salts thereof from nitroguanidine by the use of a metal in the presence of an aqueous solution of an acetate of a heavy metal. Up to the present time aminoguanidine and its salts have been prepared by the reduction of nitroguanidine by means of acetic acid and zinc dust. The process has many disadvantages, principally due to the highly exothermic nature of the reaction. Unless very large quantities of crushed ice are used when acetic acid is added to the mixture of zinc dust and nitroguanidine, the temperature may rise suddenly, and such rise in temperature materially reduces the yield of aminoguanidine, and may entirely prevent its formation.

Other disadvantages of the present process employing zinc dust and acetic acid are the relatively low yields of the reaction, even when conducted under the best conditions at present known, and the very bulky nature of the reaction mixture during the reducing step. Still other disadvantages are the difficulty of satisfactory control of the temperature after the acetic acid has been added, and the rather considerable time required for the normal progress of the reaction, this time being usually from one hour to two hours or even more, depending upon the quality of the zinc dust which is used. I have discovered that during prolonged reaction the production of reduction products such as guanidine, carbon dioxide, ammonia, nitrogen, nitrous oxide and hydrazine may occur.

I have discovered that by employing an acetate of a metal instead of free acetic acid, and preferably by employing an acetate of a metal in the absence of free acetic acid but in the presence of a very small amount of a catalytic body such as copper sulfate for example, I not only obtain improved yields of aminoguanidine but I can completely avoid the use of ice as a cooling agent. In my process the total heat generated in the reducing reaction is much less than the heat developed by the reducing process at present known and used, and the reaction also proceeds in a much smoother manner. Because of these conditions I find that I can control the progress of the reaction by the use of cooling water without the employment of crushed ice, and with the avoidance of the production of undesired by-products, and with the production of a higher yield of aminoguanidine of very high purity.

As an example of my present invention, I may employ a reaction mixture of

| | Parts |
|---|---|
| Nitroguanidine | 52 |
| Zinc dust | 160 |
| Water | 500 |

The above reagents are thoroughly mixed, preferably in a water jacketed reaction vessel provided with a stirrer. To the cooled mixture there is then added the following:

| | Parts |
|---|---|
| Zinc acetate (as crystals) | 72 |
| Water | 500 |
| $CuSO_4.5H_2O$ | 1 |

No noticeable rise in temperature takes place at the time of the addition of the zinc acetate solution, but the temperature commences to rise shortly thereafter, and continues to rise until a temperature of about 45° C. is reached, at which point further increase in the temperature of the reaction mixture should be checked by the circulation of water through the cooling coils of the reaction vessel. The temperature should preferably be maintained between a minimum of 40° C. and a maximum of 45° C. during the progress of the reaction, the temperature being maintained within these limits by passing cold water through the cooling coils whenever the temperature tends to approach 45° C., and by the passage of warm water through the coils whenever the temperature shows a tendency to approach the lower limit of 40° C.

Under the conditions described the reaction is complete in about 45 minutes, and the reaction mixture is then filtered. The filtrate is colorless, and contains the aminoguanidine in the form of the acetate. From the acetate any other salt of aminoguanidine may be obtained by well known methods.

By my process I obtain a yield of aminoguanidine, bicarbonate, for example, equivalent to 90% or more of the weight of the nitroguanidine used, although by the usual process the yield of aminoguanidine bicarbonate is usually about 65% of the weight of nitroguanidine started out with.

Although I have described above a specific example of my invention, it will of course be evident that my invention is not strictly limited to the specific embodiment herein described. I may vary the proportions of the reacting materials over a rather wide range and still obtain better yields than are obtainable by the customary use of acetic acid and zinc dust.

Although I prefer to employ copper sulfate as my catalytic agent, because of its high activity in the reaction, I do not wish to limit myself to the employment of this particular salt of copper, as I have obtained very excellent results from the use of other copper salts such as copper acetate and copper chloride. I have also found that instead of salts of copper I may employ salts of nickel, cobalt, manganese and cadmium as catalysts, and my investigation has indicated that there are also many other metallic salts which may be employed as catalysts, although generally with far less satisfactory results than are obtained by the use of the compounds herein mentioned.

The amount of water may be varied according to the type and quality of the zinc dust used, a larger amount of water being required when the zinc dust is very fine, or when it is of a flaky nature.

Instead of zinc acetate, I may employ other acetates, such as the acetates of ammonium, magnesium, iron, aluminum and chromium, although I prefer to employ zinc acetate because of the very satisfactory nature of the reaction when this particular reagent is employed.

The procedure for handling the filtrate obtained by filtering the completed reaction mixture and the method of washing the cake upon the filter, will depend to some extent upon the salt of aminoguanidine that is desired. If aminoguanidine nitrate is desired, I prefer to add an excess of sodium bicarbonate in the form of a very fine powder or in the form of a thick paste, directly to the filtrate without evaporating the filtrate. The aminoguanidine forms aminoguanidine bicarbonate which is practically insoluble in water and which can be readily removed by filtration, followed by washing and drying. The nitrate of aminoguanidine can be made by treating the aminoguanidine bicarbonate with dilute nitric acid, followed by evaporation, crystallization and drying.

To make the hydrochloride, sulfate, etc. the bicarbonate may conveniently be treated with the corresponding acid in dilute condition, followed by the evaporation of the solution to crystallization, with the customary steps of cooling the evaporated solution and separating, and drying the crystals obtained.

Although I prefer to employ the amount of copper given in the example above, I may use a larger quantity without detriment to the process. I may use an amount of copper acetate for example, chemically equivalent to the amount of zinc acetate designated in the illustration given, in this case the use of zinc acetate being unnecessary. Similarly I may employ nickel acetate, cobalt acetate, manganese acetate and cadmium acetate, in which case the metallic acetate used serves in the dual capacity of catalytic agent and as acetate carrier. I may also use equivalent quantities of ammonium acetate, iron acetate, aluminum acetate, or chromium acetate supplemented by the addition of a small amount of any of the catalytic agents mentioned above. When the larger amounts of nickel acetate, cobalt acetate, manganese acetate, cadmium acetate and copper acetate are used, the reaction proceeds much faster than it does when the process is carried out in accordance with the illustration given above.

I claim:

1. The process of reducing nitroguanidine to aminoguanidine by the use of zinc in the presence of an aqueous solution of a metal acetate in the substantial absence of free acetic acid.

2. The process for reducing nitroguanidine to aminoguanidine by the use of zinc in the presence of an aqueous solution of a metal acetate and a water soluble salt of copper in the substantial absence of free acetic acid.

3. The process for reducing nitroguanidine to aminoguanidine by the use of zinc in the presence of an aqueous solution of a metal acetate and copper sulfate in the substantial absence of free acetic acid.

4. As a step in the manufacture of aminoguanidine the process which comprises reducing nitroguanidine by zinc in the presence of a metal acetate in conjunction with a water soluble salt of a metal from the group consisting of copper, nickel, cobalt, manganese, and cadmium, in the substantial absence of free acetic acid.

5. As a step in the manufacture of aminoguanidine the process which comprises reducing nitroguanidine by zinc in the presence of a metal acetate, in the presence of a water soluble salt of a metal from the group consisting of copper, nickel, cadmium, cobalt and manganese as a catalyst, in the substantial absence of free acetic acid.

JOSEPH A. WYLER.